United States Patent
Li et al.

(10) Patent No.: US 10,692,099 B2
(45) Date of Patent: Jun. 23, 2020

(54) FEATURE LEARNING ON CUSTOMER JOURNEY USING CATEGORICAL SEQUENCE DATA

(71) Applicant: INTERNATIONAL BUSINESS MACHINES CORPORATION, Armonk, NY (US)

(72) Inventors: Hongfei Li, Briarcliff Manor, NY (US); Anshul Sheopuri, Teaneck, NJ (US); Jinfeng Yi, Ossining, NY (US); Qi Yu, Los Angeles, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 873 days.

(21) Appl. No.: 15/095,850

(22) Filed: Apr. 11, 2016

(65) Prior Publication Data
US 2017/0293919 A1    Oct. 12, 2017

(51) Int. Cl.
*G06Q 30/02*    (2012.01)
*G06N 5/02*    (2006.01)
*G06N 99/00*    (2019.01)
*G06N 20/00*    (2019.01)

(52) U.S. Cl.
CPC ......... *G06Q 30/0201* (2013.01); *G06N 20/00* (2019.01)

(58) Field of Classification Search
CPC ..... G06Q 30/0201; G06N 5/02; G06N 99/005
USPC ........................................................ 706/12
See application file for complete search history.

(56) References Cited

U.S. PATENT DOCUMENTS

| | | | | |
|---|---|---|---|---|
| 7,630,986 B1* | 12/2009 | Herz | .................. | G06Q 10/10 |
| 8,676,805 B1* | 3/2014 | Long | .................. | G06N 7/005 |
| | | | | 707/737 |
| 8,996,350 B1* | 3/2015 | Dub | .................. | G06F 16/285 |
| | | | | 704/1 |
| 2011/0026853 A1* | 2/2011 | Gokturk | ............ | G06K 9/00375 |
| | | | | 382/305 |
| 2013/0251340 A1* | 9/2013 | Jiang | .................. | G06K 9/00718 |
| | | | | 386/244 |
| 2014/0215606 A1 | 7/2014 | Flowers | | |
| 2014/0280146 A1 | 9/2014 | Wood et al. | | |
| 2017/0147721 A1* | 5/2017 | Tadeski | .................. | G06F 17/16 |
| 2017/0200125 A1* | 7/2017 | Wang | .................. | G06F 17/211 |

OTHER PUBLICATIONS

Zhang: "From Categorical to Numerical: Multiple Transitive Distance Learning and Embedding", Copyright © SIAM, Downloaded Aug. 21, 2015. (Year: 2015).*
IBM et al., "An Information Theoretic Approach for Customer Modeling", ip.com, Jul. 2002, 14 pages.

(Continued)

*Primary Examiner* — Kuen S Lu
(74) *Attorney, Agent, or Firm* — Tutunjian & Bitetto, P.C.; Joseph Petrokaitis

(57) ABSTRACT

A method and system are provided. The method includes converting, by a computer having a processor and a memory, categorical sequence data for a customer journey into a numerical similarity matrix. The method further includes learning, by the computer, features of the customer journey by applying a distance metric learning based matrix factorization approach to the numerical similarity matrix.

23 Claims, 8 Drawing Sheets

(56) References Cited

OTHER PUBLICATIONS

Anonymous, et al., Method and System for Providing a Database Storage Apparatus for Similarity Matching over Data Series Using Dictionaries, ip.com, May 2014, 5 pages.
Anonymous, et al., "Weight Quantification Model in the Feature Space for Biometric Evidence", Nov. 2015, 17 pages.

* cited by examiner

500 ⟶

Similarity
Matrix S

| 1 | 0.58 | 0.59 | 0.79 | 0.96 |
|---|---|---|---|---|
| 0.58 | 1 | 0.22 | 0.95 | 0.77 |
| 0.59 | 0.22 | 1 | 0.39 | 0.56 |
| 0.79 | 0.95 | 0.39 | 1 | 0.92 |
| 0.96 | 0.77 | 0.56 | 0.92 | 1 |

Binary
Matrix X

| 0 | 0 | 1 |
|---|---|---|
| 1 | 0 | 0 |
| 0 | 1 | 0 |
| 1 | 1 | 0 |
| 0 | 0 | 1 |

Weighting
Matrix M

| 0.91 | -0.07 | 0.54 |
|---|---|---|
| -0.07 | 0.53 | 0.45 |
| 0.54 | 0.45 | 0.98 |

FIG. 7

FEATURE LEARNING ON CUSTOMER JOURNEY USING CATEGORICAL SEQUENCE DATA

BACKGROUND

Technical Field

The present invention generally relates to data processing, and more particularly to feature learning on customer journey using categorical sequence data.

Description of the Related Art

Customer journeys very often are described by a series of categorical sequences which are neither numerical (such as $200, 5 feet) nor ordered (such as high, medium, low). Accordingly, it is quite difficult to represent customer behaviors using this type of information.

One example of a non-ordered and non-numerical categorical sequence is a person's trajectory path. For example, the following categorical sequences can be generated for a person's trajectory path:
Home→food→outdoors→shop→home
Work→sports→food→home
Connecticut→Wisconsin→Florida Another example of a non-ordered and non-numerical categorical sequence is a user click stream. For example, the following categorical sequences can be generated for a user click stream:
Home→search→product description→shopping cart→check out
Home→product description→search→product description One such challenge in representing such categorical sequences is determining a categorical property. For example, most learning models only accept numerical inputs. Also, the distance between categorical data is hard to measure. For example, what is the distance between "home→food" and "food→shop"?

Another such challenge in representing such categorical sequences is determining a sequential property in the case when the data includes sequence information. However, many learning models cannot capture sequence information.

SUMMARY

According to an aspect of the present principles, a method is provided. The method includes converting, by a computer having a processor and a memory, categorical sequence data for a customer journey into a numerical similarity matrix. The method further includes learning, by the computer, features of the customer journey by applying a distance metric learning based matrix factorization approach to the numerical similarity matrix.

According to another aspect of the present principles, a non-transitory computer readable storage medium is provided. The non-transitory computer readable storage medium includes a computer readable program for feature learning. The computer readable program when executed on a computer causes the computer to perform steps of a method. The method includes converting, by a computer having a processor and a memory, categorical sequence data for a customer journey into a numerical similarity matrix. The method further includes learning, by the computer, features of the customer journey by applying a distance metric learning based matrix factorization approach to the numerical similarity matrix.

According to yet another aspect of the present principles, a system is provided. The system includes a computer, having a processor and a memory. The computer is configured to convert categorical sequence data for a customer journey into a numerical similarity matrix. The computer is further configured to learn features of the customer journey by applying a distance metric learning based matrix factorization approach to the numerical similarity matrix.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 shows an exemplary similarity matrix S, in accordance with an embodiment of the present principles.

FIG. 6 shows an exemplary binary matrix X, in accordance with an embodiment of the present principles.

FIG. 7 shows an exemplary weighting matrix M, in accordance with an embodiment of the present principles

DETAILED DESCRIPTION

The present principles are directed to feature learning on customer journey using categorical sequence data that is unnumbered and unordered. As used herein, the term "unordered"

The present principles provide an automatic solution to learn widely applicable features based on categorical sequence data.

Among other things, the one or more exemplary embodiments described herein represent customer behaviors from a series of categorical sequences. Thus, in an embodiment, the present principles include the following two steps: (1) convert the categorical sequence data into a numerical similarity matrix; and (2) learn the features by a distance metric learning based matrix factorization approach.

Some of the many attendant advantages of the present principles include, but are not limited to, the following: (1) the learned feature is numerical and continues and is, thus, widely-applicable; (2) the sequence information is naturally captured by the new feature; and (3) the hidden factors that can influence the categorical sequence patterns and the relationships between different patterns are automatically learned. These and many other attendant advantages of the present principles are readily determined by one of ordinary skill in the art given the teachings of the present principles provided herein, while maintaining the spirit of the present principles.

Figure 1:
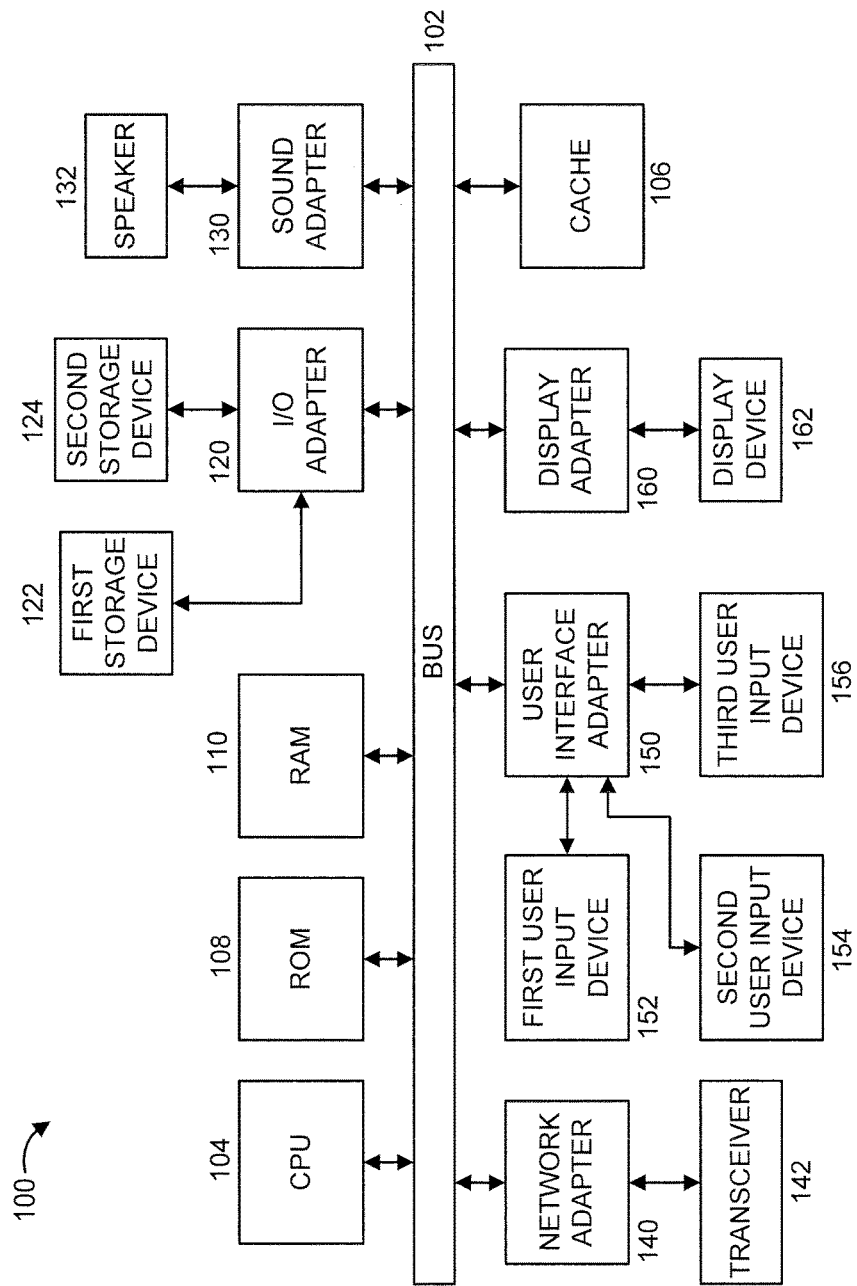
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154 and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
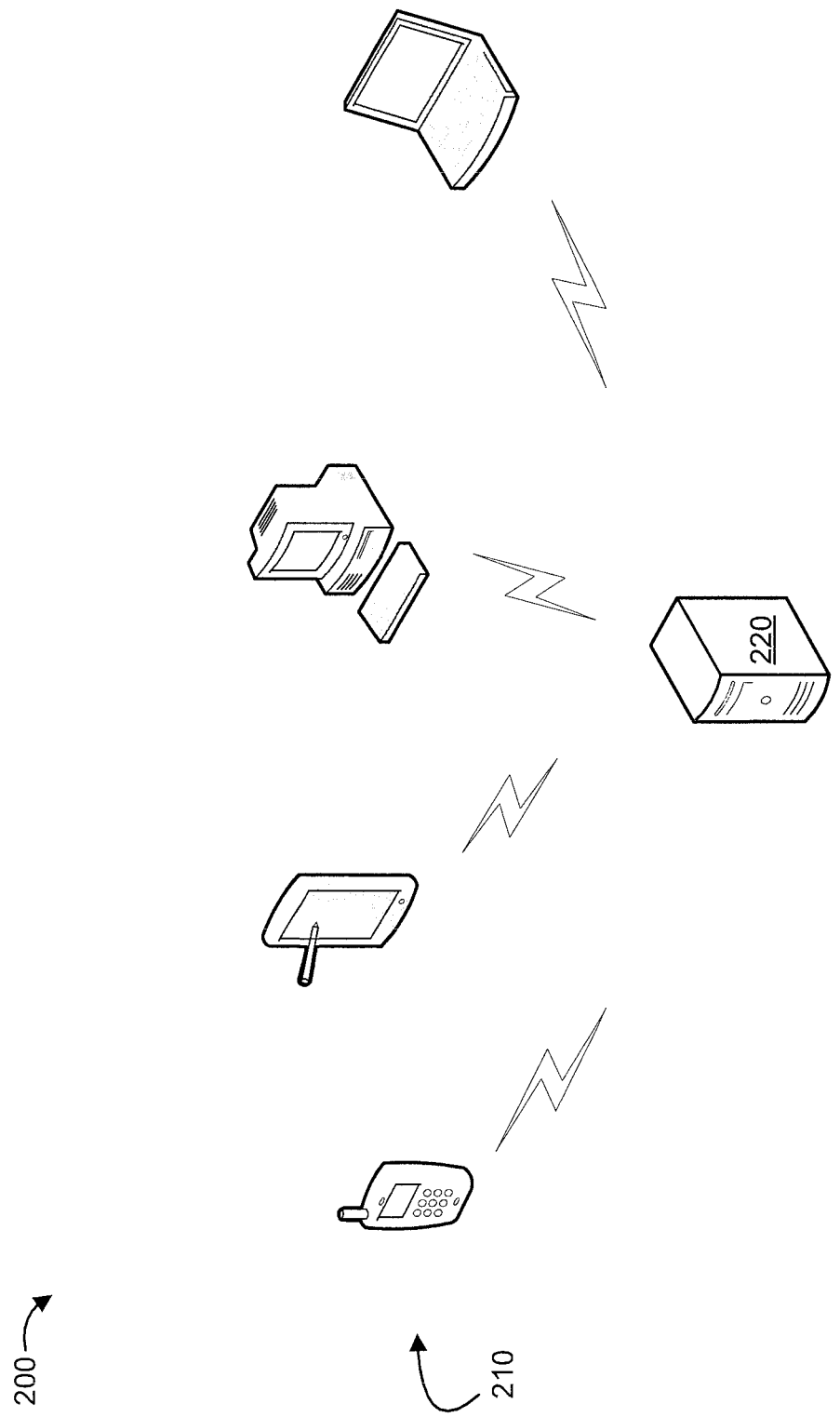
FIG. 2 shows an exemplary environment to which the present principles can be applied, in accordance with an embodiment of the present principle.

FIG. 2 shows an exemplary environment 200 to which the present principles can be applied, in accordance with an embodiment of the present principles.

The environment 200 includes a set of user devices 210 and a centralized server 220.

Each device in the set of user devices 210 generates categorical sequence data for one or more customer journeys for a respective customer. As used herein, the term "customer journey" means the interactions of a user/customer with respect to performing a particular task (e.g., shopping, researching, purchasing, comparing, etc.). The categorical sequence data can relate to, for example, people's trajectory paths, user click streams, DNA transcription sequences, electronic health records (which store the clinical history of patients), and so forth. The user devices 210 can include, but are not limited to, smart phones, laptops, personal digital assistants, media players, tablets, personal computers, and so forth.

The centralized server 220 receives categorical sequence data for customer journeys for a set of customers. In the embodiment of FIG. 2, the categorical sequence data is received from the set of user devices 210. The centralized server 220 learns features of the customer journeys of each of the customers based on the categorical sequence data. In an embodiment, the centralized server 220 learns the features of customer journeys by converting the categorical sequence data into a numerical similarity matrix and applying a distance metric learning based matrix factorization approach to the numerical similarity matrix. In an embodiment, the distance metric learning based matrix factorization approach involves forming a binary matrix and applying an objective function to the binary matrix. In an embodiment, the centralized server 220 also learns the hidden factors that can influence the categorical sequence patterns and the relationships between different categorical sequence patterns.

The learned features can then be used for various purposes as readily appreciated by one of ordinary skill in the art. For example, the features can be applied to various models (e.g., regression, clustering, and classification models) for various purposes as described herein, while maintaining the spirit of the present principles. Of course, the present principles are not limited to solely the preceding applications and, thus, other applications to which the learned features can be applied, are readily determined by one of ordinary skill given the teachings of the present principles provided herein, while maintaining the spirit of the present principles.

In an embodiment, the centralized server 220 is implementing in the cloud using a cloud configuration. For example, FIGS. 5-7 show various aspects of the present principles relating to cloud computing. These and other variations of the elements of system 200 are readily determined by one of ordinary skill in the art given the teachings of the present principles provided herein, while maintaining the spirit of the present principles.

Figure 3:
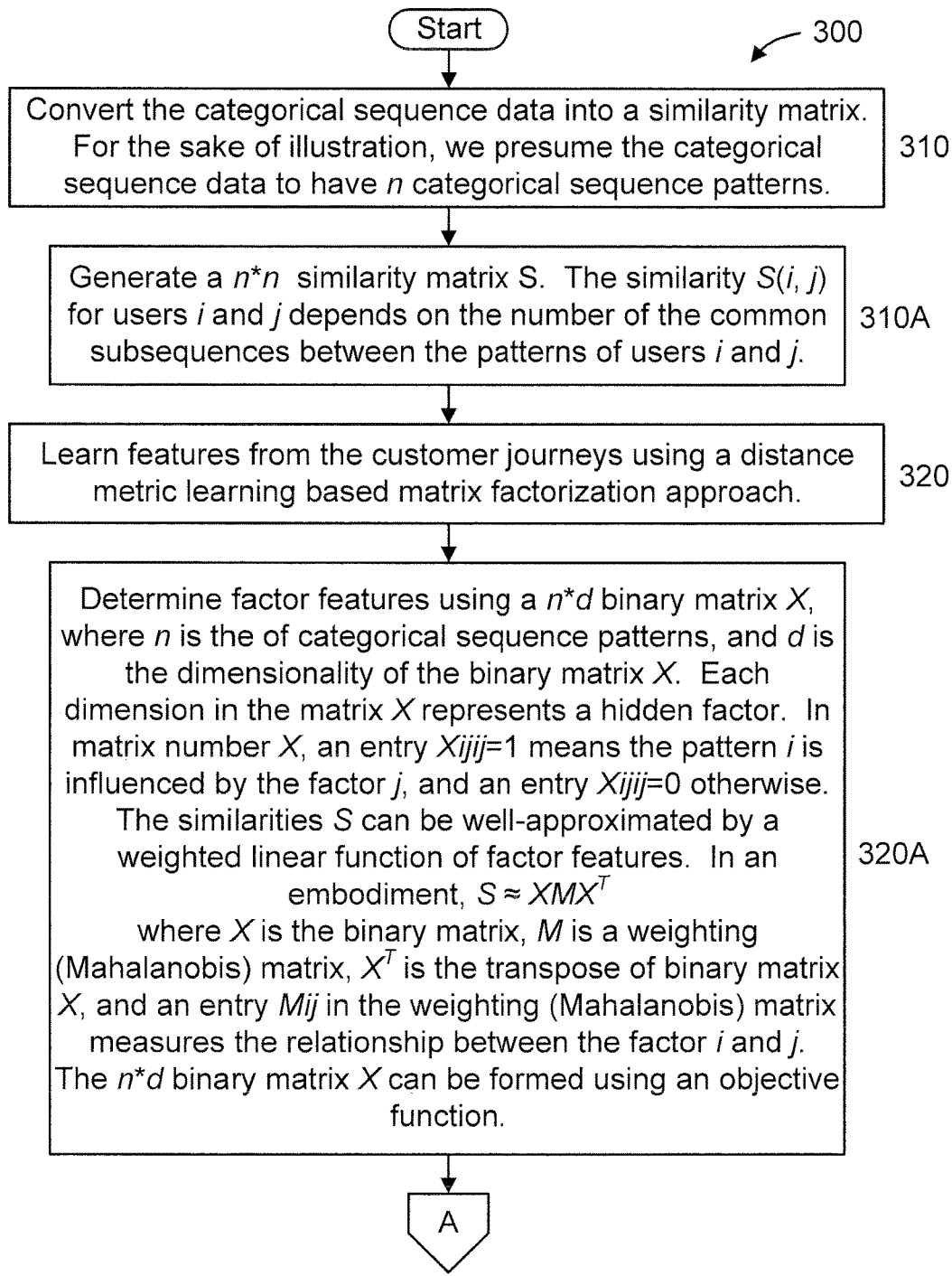
FIGS. 3-4 show an exemplary method for feature learning on customer journey using categorical sequence data, in accordance with an embodiment of the present principles.
Figure 4:
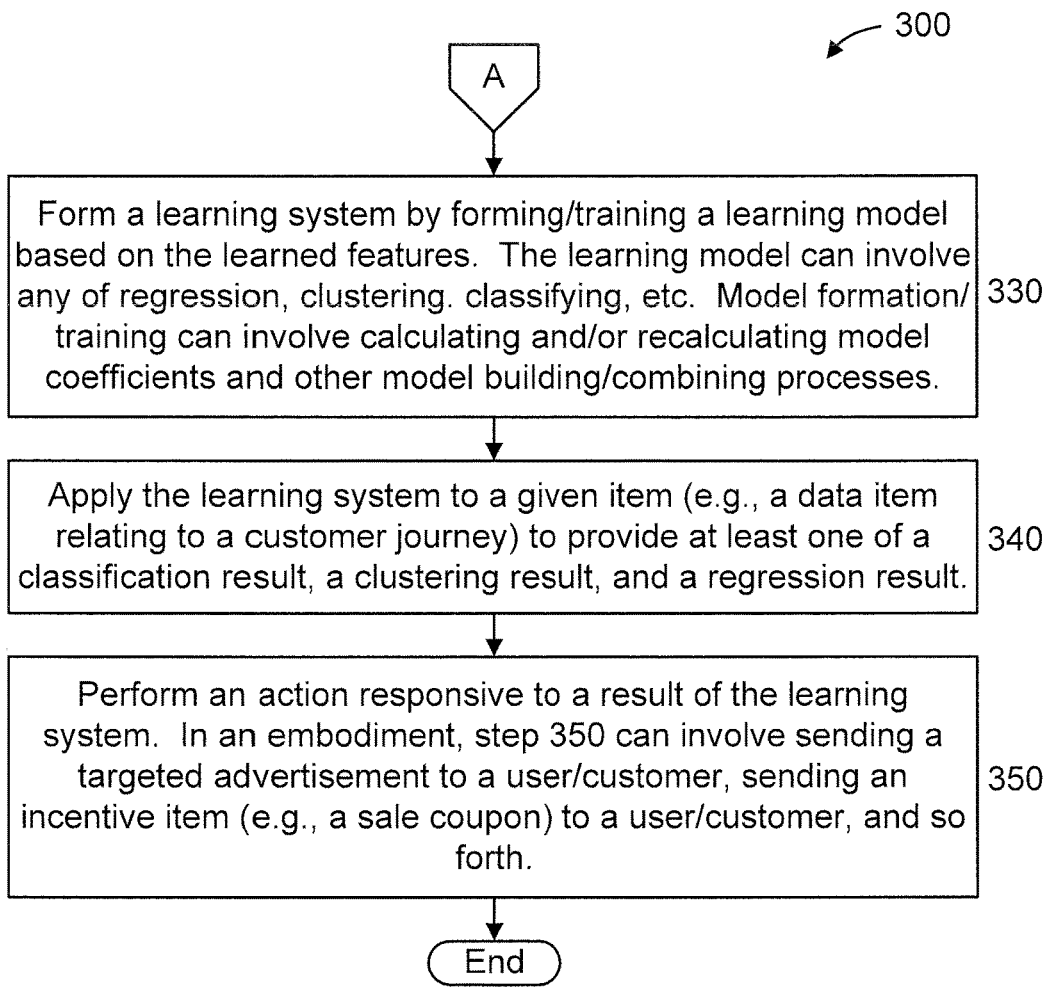

FIGS. 3-4 show an exemplary method 300 for feature learning on customer journey using categorical sequence data, in accordance with an embodiment of the present principles.

At step 310, convert the categorical sequence data into a similarity matrix. For the sake of illustration, we presume the categorical sequence data to have n categorical sequence patterns.

In an embodiment, step 310 includes step 310A.

At step 310A, generate a n*n similarity matrix S. The similarity $S(i, j)$ for users i and j depends on the number of the common subsequences between the patterns of users i and j.

For example, consider the following patterns of users i and j:
Pattern i: home→food→outdoors→shop→home
Pattern j: work→shop→home→food→outdoors
The following subsequence tallies apply:
\# common length-1 subsequences: home, food, shop, outdoors (4/5)
\# common length-2 subsequences: home→food, food→outdoors (2/10)
\# common length-3 subsequences: home→food→outdoors (1/10)
\# common length-4 subsequences: N/A (0/5)
\# common length-5 subsequences: N/A (0/1)

In an embodiment, the weighted average is as follows:

$$S(i,j)=4/5*1/5+2/10*1/5+1/10*1/5+0/5*1/5+0/1*1/5=0.22$$

FIG. 5 shows an exemplary similarity matrix S 500, in accordance with an embodiment of the present principles. The preceding value of 0.22 for S(i, j) is shown in matrix S 500 in the entry that intersects at the second row from the top and the third row from the left.

At step 320, learn features from the customer journeys using a distance metric learning based matrix factorization approach.

In an embodiment, step 320 includes steps 320A

At step 320A, determine factor features using a n*d binary matrix X, where n is the number of categorical sequence patterns, and d is the dimensionality of the binary matrix X. Each dimension in the matrix X represents a hidden factor. In matrix X, an entry Xijij=1 means the pattern i is influenced by the factor j, and an entry Xijij=0 otherwise. The factors that can influence each pattern should be sparse.

The similarities S can be well-approximated by a weighted linear function of factor features. In an embodiment, $$S \approx XMX^T$$

where X is the binary matrix, M is a weighting (Mahalanobis) matrix, $X^T$ is the transpose of matrix X, and an entry Mij in the weighting (Mahalanobis) matrix measures the relationship between the factor i and j.

In an embodiment, a n*d binary matrix X is formed using an objective function as follows:

$$\min_{X \in \{0,1\}^{n \times d}, M \in \mathbb{R}^{d \times d}} \quad \|S - XMX^T\|_F + \lambda\|X\|_1$$
$$\text{s.t.} \quad M \text{ is a PSD matrix}$$

where M is a positive-definite matrix, $\mathbb{R}$ is the set of real numbers, F is the learned feature (F=XM^{1/2}), $X^T$ is the transpose of matrix X, λ is a value >0 and is used to balance the term terms $\|S-XMX^T\|F$ and $\|X\|_1$.

FIG. 6 shows an exemplary binary matrix X 600, in accordance with an embodiment of the present principles.

FIG. 7 shows an exemplary weighting matrix M 700, in accordance with an embodiment of the present principles.

At step 330, form a learning system by forming/training a learning model based on the learned features. The learning model can involve any of regression, clustering. classifying, etc. Model formation/training can involve calculating and/or recalculating model coefficients and other model building/combining processes as readily appreciated by one of ordinary skill in the art given the teachings of the present principles provided herein.

At step 340, apply the learning system to a given item (e.g., a data item relating to a customer journey) to provide at least one of a classification result, a clustering result, and a regression result. For example, classify a piece of data with respect a particular type of customer journey. In this way, a prediction can then made, for example, of an object a user is interested in (e.g., for purchase), depending upon their journey. In an embodiment, the result of the learning system itself can be the prediction.

At step 350, perform an action responsive to a result of the learning system. In an embodiment, step 350 can involve sending a targeted advertisement to a user/customer, sending an incentive item (e.g., a sale coupon) to a user/customer, redirecting a user to a particular webpage (e.g., having something of interest to the user such as a particular medicine, a particular type of doctor, and so forth, as determined (learned) from electronic health records provided as the categorical sequence data), providing assistance for an actual trip taken by the user (e.g., where the assistance is provided at a juncture where the user is likely to experience a problem as predicted from categorical sequence data relating to the actual trip (e.g., from categorical sequence data of this user and/or other users who have previously taken the same trip)), and so forth. These and other uses of the features learned by the present principles are readily determined by one of ordinary skill in the art given the teachings of the present principles provided herein, while maintaining the spirit of the present principles.

Exemplary applications/uses to which the present principles can be applied include, but are not limited to: classification models; regression models; and clustering models. The features learned by the present principles can be used for any purpose relating to at least the aforementioned models including, but not limited to, forming the models, training the models, using/applying the models, and so forth. Regarding classification models to which the present principles can be applied (for any of forming/training/using/ etc.), the same include, but are not limited to, Support Vector Machines SVMs, logistic regressions, random forests, and so forth. Regarding regression models to which the present principles can be applied (for any of forming/training/using/ etc.), the same include, but are not limited to, Support Vector Regressions (SVRs), least square regressions, regression trees, and so forth. Regarding clustering models to which the present principles can be applied (for any of forming/ training/using/etc.), the same include, but are not limited to, k-means clustering, spectral clustering, and Gaussian Mixture Model (GMM) clustering, and so forth. It is to be appreciated that the preceding types of classification models, regression models, and clustering models are merely illustrative and that the present principles can be applied to other types of these models, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
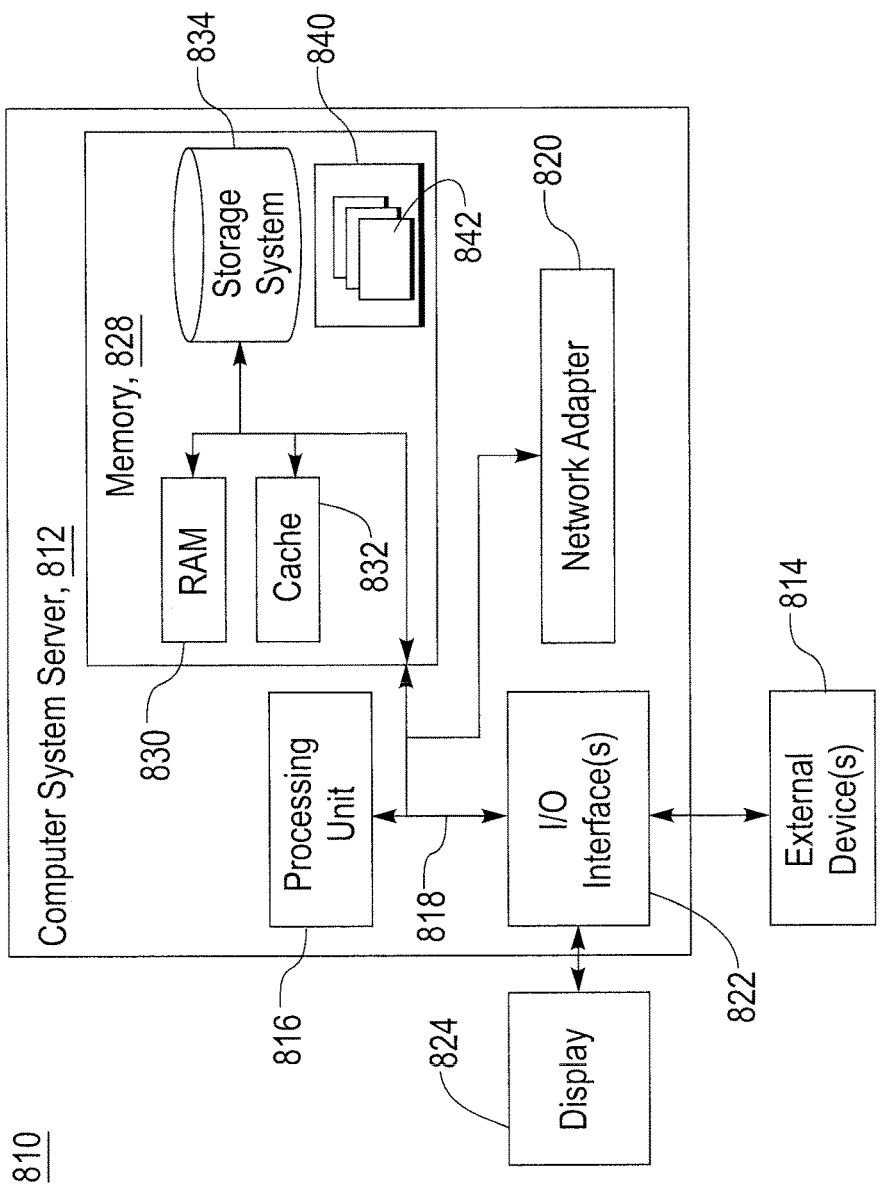
FIG. 8 shows an exemplary cloud computing node, in accordance with an embodiment of the present principles.

Referring now to FIG. 8, a schematic of an example of a cloud computing node 810 is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
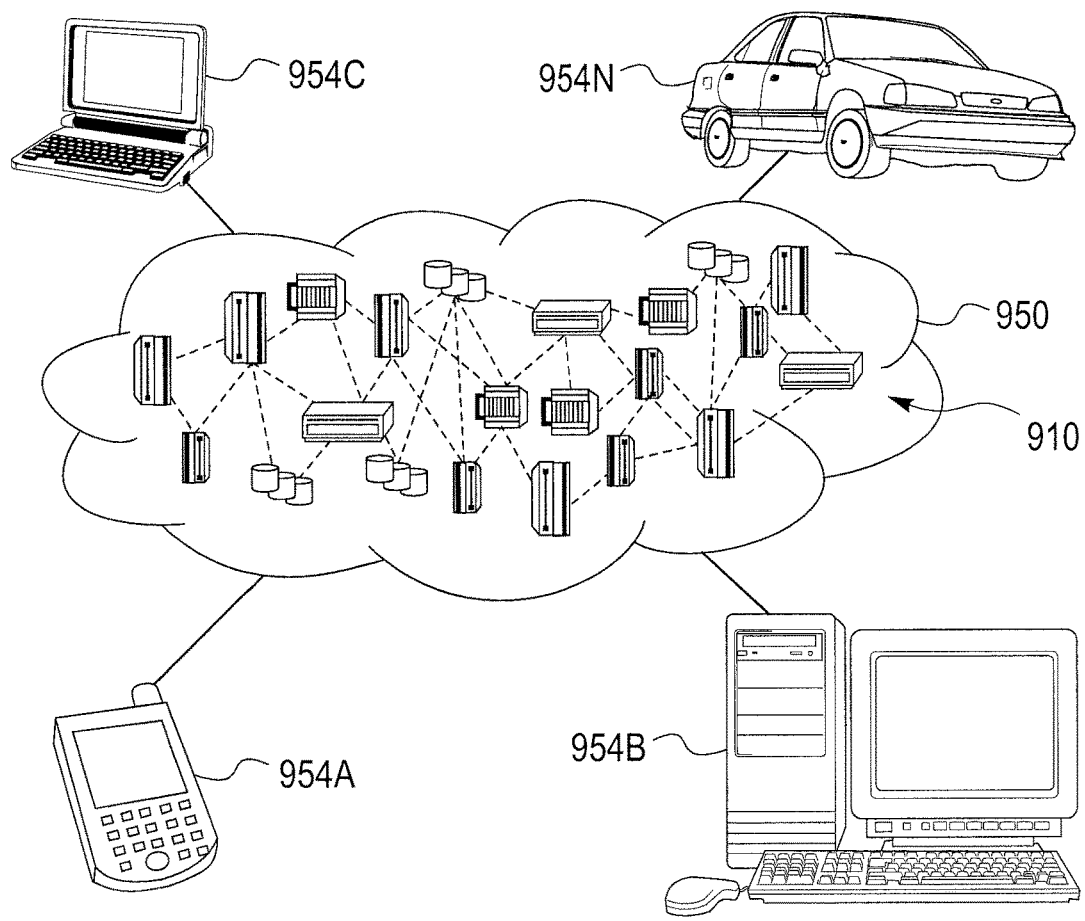
FIG. 9 shows an exemplary cloud computing environment, in accordance with an embodiment of the present principles.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
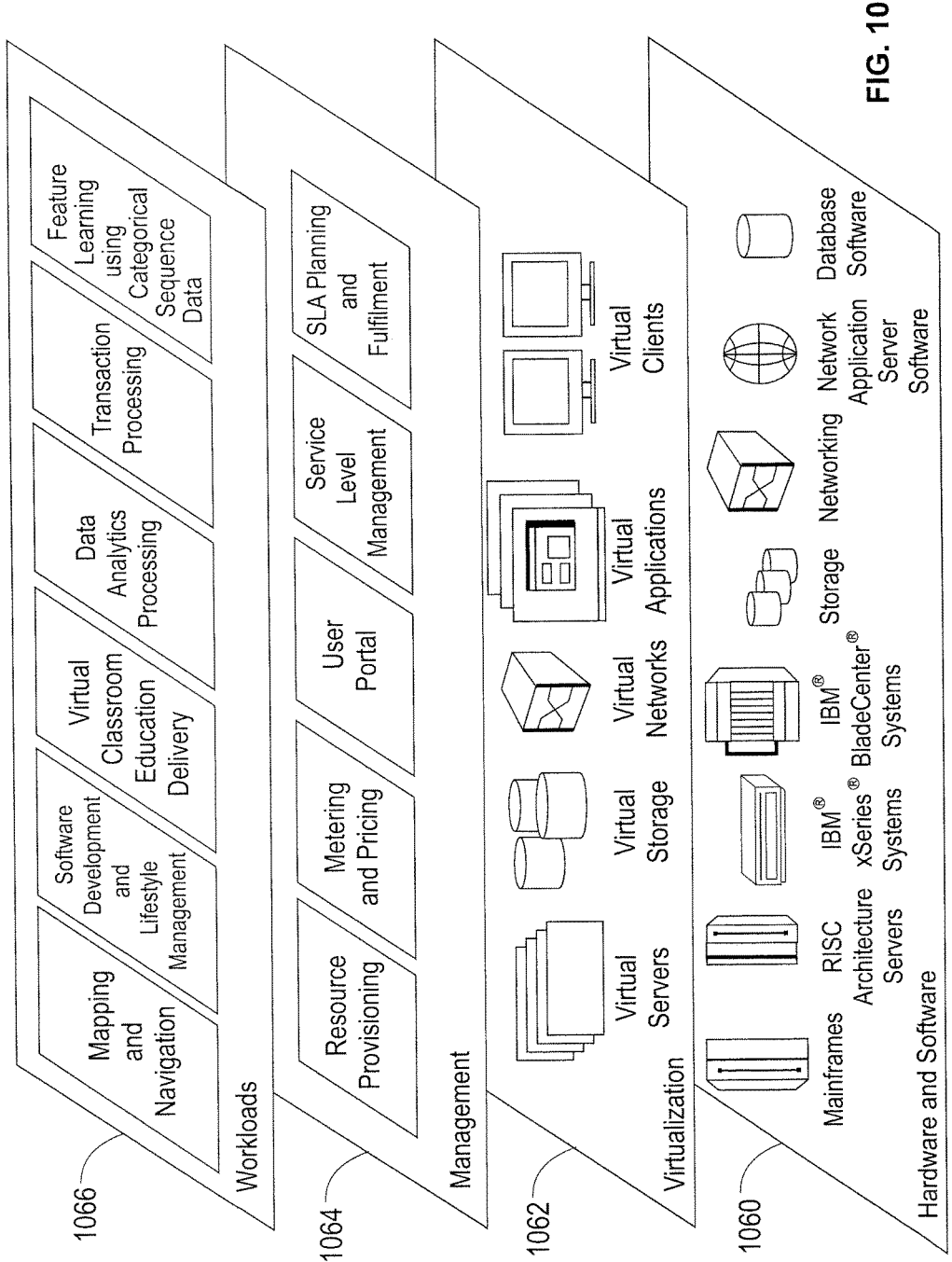
FIG. 10 shows exemplary abstraction model layers, in accordance with an embodiment of the present principles.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes; RISC (Reduced Instruction Set Computer) architecture based servers; blade servers; storage devices; networks and networking components. Examples of software components include network application server software; and database software.

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and feature learning on customer journey using categorical sequence data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    converting, by a computer having a processor and a memory, categorical sequence data for an actual customer journey taken by an actual customer into a numerical similarity matrix; and
    learning, by the computer, features of the customer journey by applying a distance metric learning based matrix factorization approach to the numerical similarity matrix, the distance metric learning based matrix factorization approach involving forming a n*d binary matrix using an objective function, where n is a number of categorical sequence patterns, and d is a dimensionality of the binary matrix, wherein each dimension in the binary matrix represents a hidden factor from a set of hidden factors,
    wherein the categorical sequence data is non-numerical and lacks an explicit ordering.

2. The method of claim 1, wherein the features are numerical.

3. The method of claim 1, further comprising forming a computer learning system by applying a machine learning process to the features.

4. The method of claim 1, further comprising classifying an object by applying a classification model to the features.

5. The method of claim 1, further comprising clustering a set of objects by applying a clustering model to the features.

6. The method of claim 1, further comprising performing a regression operation to generate a relationship estimate between at least two variables by applying a regression model to the features.

7. The method of claim 1, wherein the distance metric learning based matrix factorization approach automatically learns hidden factors that influence patterns in the categorical sequence data based on the numerical similarity matrix.

8. The method of claim 1, wherein the distance metric learning based matrix factorization approach automatically learns relationships between different patterns in the categorical sequence data based on the numerical similarity matrix.

9. The method of claim 1, wherein the distance metric learning based matrix factorization approach automatically learns implicit sequence information in the categorical sequence data based on the numerical similarity matrix.

10. The method of claim 1, wherein the numerical similarity matrix is formed based on respective numbers of common subsequences between patterns in the categorical sequence data for the customer journey of two users.

11. The method of claim 10, wherein the common subsequences comprise a plurality of subsequences having different lengths.

12. The method of claim 11, wherein a similarity is determined for the numerical similarity matrix based on a weighted average of the plurality of subsequences having the different lengths.

13. The method of claim 1, wherein each entry in the binary matrix indicates whether a given respective hidden factor from the set influences a particular pattern from among a plurality of patterns in the categorical sequence data.

14. The method of claim 13, wherein an objective function measures a relationship between the given respective hidden factor and the particular pattern.

15. A non-transitory computer readable storage medium comprising a computer readable program for feature learning, wherein the computer readable program when executed on a computer causes the computer to perform the steps of:
    converting, by a computer having a processor and a memory, categorical sequence data for an actual customer journey taken by an actual customer into a numerical similarity matrix; and
    learning, by the computer, features of the customer journey by applying a distance metric learning based matrix factorization approach to the numerical similarity matrix, the distance metric learning based matrix factorization approach involving forming a n*d binary matrix using an objective function, where n is a number of categorical sequence patterns, and d is a dimensionality of the binary matrix, wherein each dimension in the binary matrix represents a hidden factor from a set of hidden factors,
    wherein the categorical sequence data is non-numerical and lacks an explicit ordering.

16. The non-transitory computer readable storage medium of claim 15, wherein the distance metric learning based matrix factorization approach automatically learns hidden factors that influence patterns in the categorical sequence data based on the numerical similarity matrix.

17. The non-transitory computer readable storage medium of claim 15, wherein the distance metric learning based matrix factorization approach automatically learns relationships between different patterns in the categorical sequence data based on the numerical similarity matrix.

18. The non-transitory computer readable storage medium of claim 15, wherein the numerical similarity matrix is formed based on respective numbers of common subsequences between patterns in the categorical sequence data for the customer journey of two users.

19. The non-transitory computer readable storage medium of claim 18, wherein the common subsequences comprise a plurality of subsequences having different lengths.

20. The non-transitory computer readable storage medium of claim 19, wherein a similarity is determined for the numerical similarity matrix based on a weighted average of the plurality of subsequences having the different lengths.

21. The non-transitory computer readable storage medium of claim 15, wherein each entry in the binary matrix indicates whether a given respective hidden factor from the set influences a particular pattern from among a plurality of patterns in the categorical sequence data.

22. A system, comprising:
    a computer, having a processor and a memory, configured to:
    convert categorical sequence data for an actual customer journey taken by an actual customer into a numerical similarity matrix; and
    learn features of the customer journey by applying a distance metric learning based matrix factorization approach to the numerical similarity matrix, the distance metric learning based matrix factorization approach involving forming a n*d binary matrix using an objective function, where n is a number of categorical sequence patterns, and d is a dimensionality of the binary matrix, wherein each dimension in the binary matrix represents a hidden factor from a set of hidden factors, wherein the categorical sequence data is non-numerical and lacks an explicit ordering.

23. The system of claim 22, wherein the computer is implemented as a server using a cloud computing configuration.

* * * * *